DIRECT CURRENT AMPLIFIER AND MODULATOR THEREFOR

Filed March 4, 1957 3 Sheets-Sheet 1

INVENTORS
William R. Hewlett
John M. Cage
BY
Flehr and Swain
ATTORNEYS

Dec. 19, 1961 W. R. HEWLETT ET AL 3,014,135

DIRECT CURRENT AMPLIFIER AND MODULATOR THEREFOR

Filed March 4, 1957 3 Sheets-Sheet 2

INVENTORS
William R. Hewlett
John M. Cage
BY
Flehr & Swain
ATTORNEYS

DIRECT CURRENT AMPLIFIER AND MODULATOR THEREFOR

Filed March 4, 1957 3 Sheets-Sheet 3

INVENTORS
William R. Hewlett
John M. Cage
BY
ATTORNEYS

United States Patent Office 3,014,135

Patented Dec. 19, 1961

3,014,135

DIRECT CURRENT AMPLIFIER AND MODULATOR THEREFOR

William R. Hewlett, Palo Alto, and John M. Cage, Los Altos, Calif., assignors to Hewlett-Packard Company, Palo Alto, Calif., a corporation of California Filed Mar. 4, 1957, Ser. No. 643,782

9 Claims. (Cl. 250—210)

This invention relates generally to direct current amplifiers and modulators therefor, and more particularly to stable high gain direct current amplifiers and photoconductive modulators.

It is a general object of the present invention to provide a novel and improved photoconductive modulator.

It is another object of the present invention to provide a photoconductive modulator in which the change of resistance of photoconductive cells in response to illumination is employed to modulate a signal.

It is another object of the present invention to provide a balanced modulator which includes photoconductive cells connected in a bridge circuit with opposite cells being alternately and cyclically illuminated by short pulses of light.

It is another object of the present invention to provide a D.-C. amplifier which includes a photoconductive modulator serving to convert a D.-C. input signal into an A.-C. signal, A.-C. amplifying means and a demodulator serving to form an amplified D.-C. signal.

It is another object of the present invention to provide a stable D.-C. amplifier which includes modulating means serving to form an A.-C. signal, amplifying means serving to receive and amplify the A.-C. signal and demodulating means serving to reconvert the A.-C. signal into a D.-C. signal, a D.-C. amplifier serving to receive the amplified D.-C. signal and to further amplify the same and a closed feedback loop serving to stabilize the amplifier.

It is another object of the present invention to provide a D.-C. amplifier of the type described which includes a tuned degenerative feedback circuit in the A.-C. amplifier circuit.

These and other objects of the invention will become more clearly apparent from the following description and accompanying drawing.

Referring to the drawing.

Figure 1:
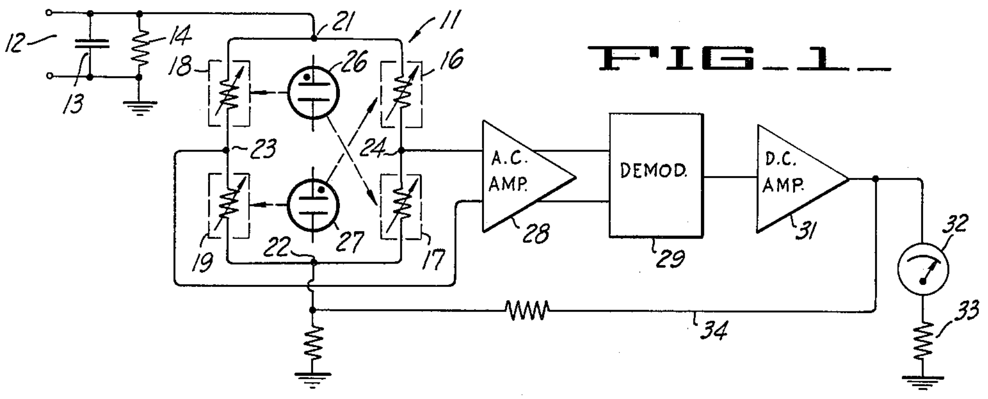
FIGURE 1 is a block diagram of a D.-C. amplifier including a meter for indicating the output.

Referring to FIGURE 1, the D.-C. input signal is applied to the modulator 11 at the terminals 12. The capacitor 13 serves as a by-pass capacitor for any A.-C. signal applied to the terminals 12, as for example, signals due to pickup and the like. The resistor 14 serves to maintain a closed circuit at the input when there is no external circuit connected between the terminals.

The modulator 11 comprises four photoconductive cells 16, 17, 18 and 19 forming the legs of a bridge circuit. The input (D.-C.) signal is applied across one pair of terminals 21 and 22, and the modulated or converted (A.-C.) signal appears across the other pair of terminals 23 and 24.

Figures 8, 9:
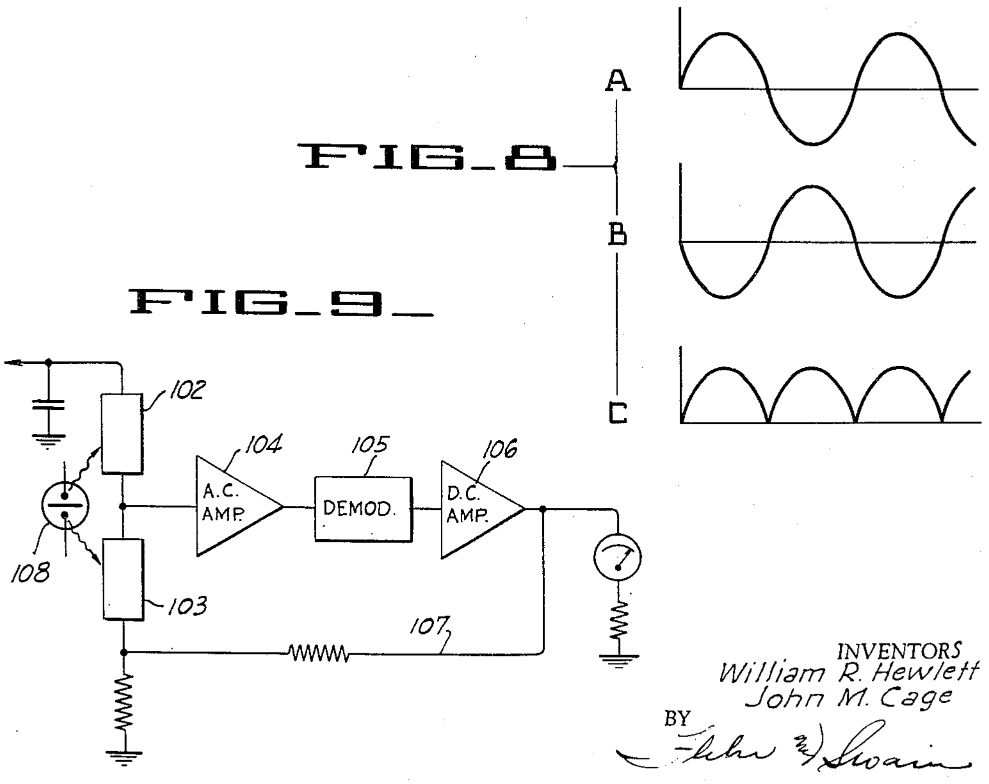
FIGURE 8 shows the amplified A.-C. voltage waveforms and the demodulated voltage waveforms.
FIGURE 9 shows another D.-C. amplifier.

Suitable means are provided for alternately illuminating opposite ones of the cells whereby their resistance is lowered. Thus, the neon tubes 26 and 27 are arranged whereby they illuminate opposite ones of the cells. For example, the neon tube 26 illuminates the cells 17 and 18 while the neon tube 27 illuminates the cells 16 and 19. The neon tubes may be illuminated at any desired frequency which then establishes the frequency of the A.-C. amplifier. Conveniently, the neon tubes are operated at line frequency. A neon tube of the type which includes a pair of electrodes in a single envelope may be employed, as illustrated in the embodiment of FIGURE 9.

The output signal from the modulator is applied to a balanced A.-C. amplifier 28, amplified by the A.-C. amplifier and applied to demodulator 29 which serves to demodulate the amplified output and to form an amplified D.-C. signal. The amplified D.-C. signal may be amplified further by the D.-C. amplifier 31. To form a voltmeter, the output D.-C. signal is applied to a suitable meter 32. The resistor 33 determines the range of the meter. A closed feedback loop 34 serves to stabilize the amplifier as will be presently described.

Figure 3:
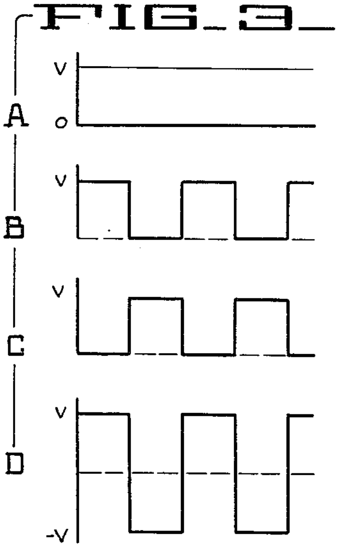
FIGURE 3 shows the input and output voltage waveform at the modulator and the idealized equivalent waveform at the balanced amplifier.

Operation of the modulator to form an A.-C. signal from the D.-C. signal may be more clearly understood with reference to FIGURE 3 where ideal waveforms are shown. The input D.-C. signal is shown at 3A, the output at the terminal 23 is shown at 3B, and the output at terminal 24 is shown at 3C. As illustrated in 3B and 3C, ideal photoconductive cells are assumed; that is, cells in which the resistance is reduced to zero when they are illuminated and instantaneously increases to the dark value when the illumination is removed. However, the ideal situation does not prevail, as will be presently described, and the voltage applied to each of the grids of the amplifier tubes decays in an exponential manner when very short pulses of light are used.

Figure 2:
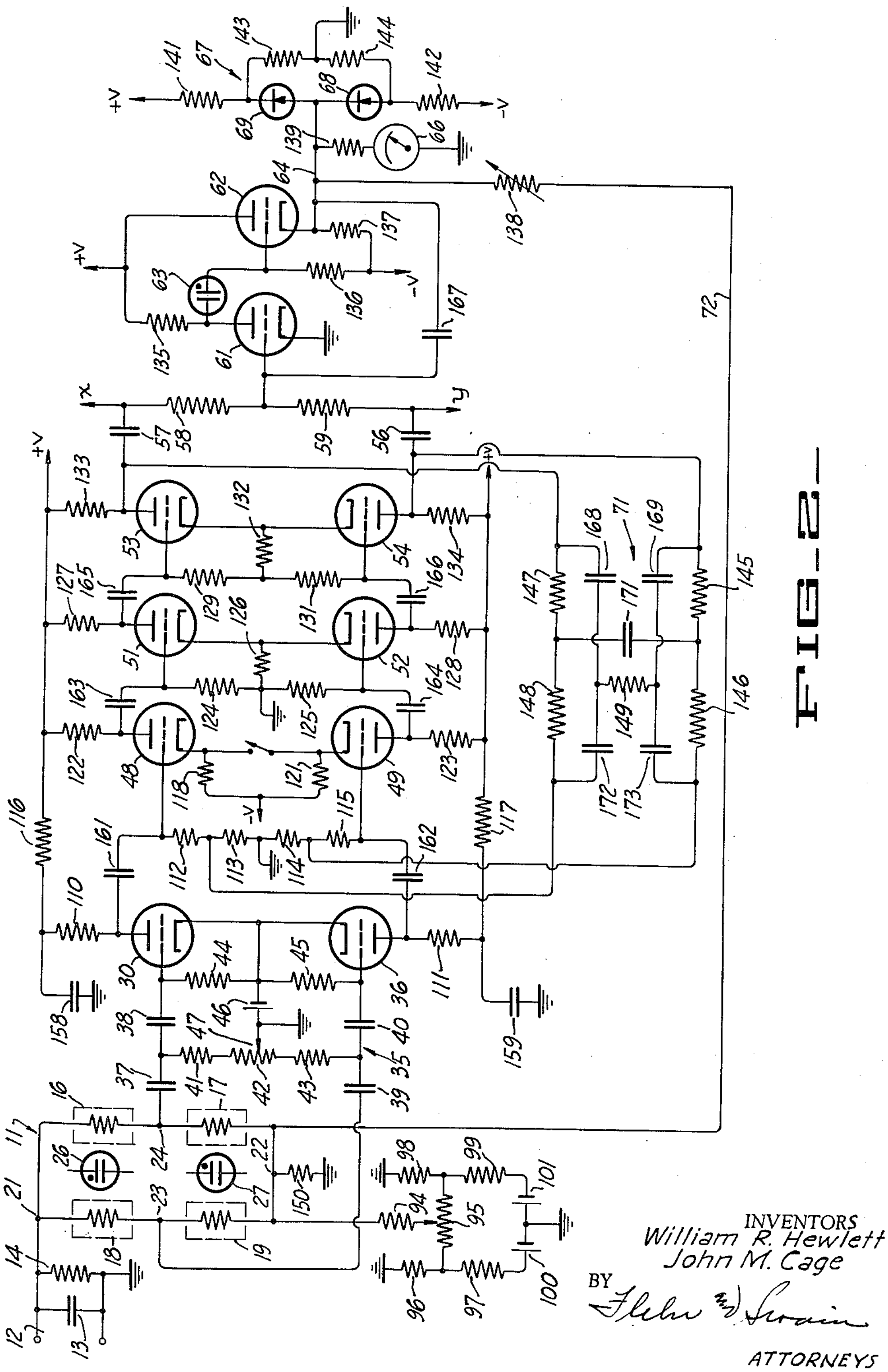
FIGURE 2 is a detailed circuit diagram of a suitable D.-C. voltmeter including a D.-C. amplifier having a photoconductive modulator.

Referring now to FIGURE 2, a detailed circuit diagram of a D.-C. voltmeter is shown. The input circuit and modulator are identical to those of FIGURE 1 and carry like reference numerals. The output from the balanced modulator is coupled through the coupling network designated generally as 35 to the grids of the tubes 30 and 36 which form the first stage of a balanced A.-C. amplifier. The junction 24 of the modulator is connected to the grid of the tube 30 through the serially connected capacitors 37 and 38 while the grid of tube 36 is coupled to the terminal 23 through the serially connected capacitors 39 and 40. The capacitors are chosen to pass signals having a frequency corresponding to that of the modulator.

Serially connected resistors 41, 42 and 43 are connected between the common junction of the capacitors 37 and 38 and 39 and 40. Serially connected resistors 44 and 45 are connected between the grids and have their common junction connected to the cathodes of tubes 30 and 36. The common junction of these resistors is also connected to one terminal of the battery 46. The other terminal of the battery is connected to the variable tap 47 of the resistor 42.

The resistors 44 and 45 and the battery 46 serve to provide a suitable grid bias voltage to the tubes 30 and 36. The network comprising the capacitors 37, 38, 39 and 40 and resistors 41, 42 and 43 forms a filter or isolator which serves to isolate the input of the amplifier from the modulator for D.-C. components of current.

Referring to FIGURE 3, the push-pull signal appearing at the grids of the tubes 30 and 36 is illustrated at FIGURE 3D. The signal is obtained by converting the D.-C. voltage, FIGURE 3A, into a pair of voltages shown in FIGURES 3B and 3C. It is seen that the magnitude between peaks of the signal, FIGURE 3D, is two times the amplitude of the signal applied to the input terminal 12. The balanced modulator serves to rectify any signal pickup having a frequency corresponding to that of the neons 26 and 27. Only A.-C. signals at two times the neon frequency will appear at the output of the modulator and be applied to the grids of the tubes 30 and 36. As will be presently described, filtering in the A.-C. amplifier will eliminate these signals. Also, the synchronous demodulator will not produce a D.-C. component from the signals.

The balanced A.-C. amplifier in FIGURE 2 includes four stages of amplification with resistive-capacitive coupling between stages. Thus, the first stage comprises the tubes 30 and 36; the second stage, the tubes 48 and 49; the third stage, the tubes 51 and 52; and the fourth stage, the tubes 53 and 54. The output of the fourth stage is capacitively coupled through the capacitors 56 and 57 to the serially connected resistors 58 and 59 and to a demodulator, to be presently described. A common terminal of the resistors 58 and 59 is connected to the grid of the tube 61 connected to operate as a D.-C. amplifier. The amplified output from the tube 61 is applied to the grid of tube 62 which is connected to operate as a cathode follower. The neon bulb 63 serves to provide a proper bias to the grid of the tube 62.

The amplified D.-C. signal then appears on the line 64. The signal may be applied to a D.-C. meter 66. The meter will then give an indication of the magnitude of the input signal. It may be calibrated and the instrument will function as a high sensitivity D.-C. voltmeter. The network designated generally by the reference numeral 67 is a limiting network which serves to prevent burning out of the meter 66. Thus, when the output voltage reaches a predetermined high value, the diode 69 conducts, and when the voltage reaches a predetermined low value, the diode 68 conducts.

Negative feedback is employed in the last three stages of the A.-C. amplifier to reduce any error signal which might arise from resistor noise, tube noise and input signals at frequencies other than the modulator frequency. The feedback circuit comprises a balanced twin-T filter 71 in which the components are chosen to produce substantially zero gain at the modulator frequency but a low attenuation at all other frequencies whereby other frequencies are degeneratively fed back. The balanced twin-T circuit also serves to balance the amplifier with respect to ground. If there is an unbalance at the output of the fourth stage, an unbalanced signal will be fed back through the filter and serve to rebalance the amplifier.

A closed feedback loop 72 is connected between the output of the cathode follower stage and the modulator. The loop serves to stabilize the amplifier against variations in tube characteristics and the like. Operation of the loop to stabilize the amplifier may be more clearly understood from the following: The gain is given by $$K'=\frac{K}{1+k\beta}$$

where K is the gain of the amplifier without feedback and $\beta$ is the feedback ratio.

If the gain K of the amplifier is high, then K' equals approximately $1/\beta$, the feedback ratio. Thus, it is seen that K' is relatively independent of changes in supply voltages, tube parameters and so forth.

Preferably, the light impulses applied to the balanced modulator by the neon tubes 26 and 27 occupy a relatively short portion of each cycle when the response of the photoconductive is not substantially instantaneous. Short light pulses may be obtained with a circuit of the type shown in FIGURE 4. The neon bulbs 26 and 27 are connected across the secondary of a saturating transformer 73. The primary of the transformer includes a current limiting capacitor 74. An A.-C. signal is applied to the primary of the transformer and a D.-C. signal is applied to the common terminal of the neon bulbs. The secondary of the transformer is center tapped and connected to ground through the resistive capacitive network 76. In operation the saturable transformer serves to provide voltage pulses of short duration to the neon bulbs. Referring to FIGURE 5, the bulb 26 is illuminated for a short time, for example 10% of each cycle as indicated at 5A, and the bulb 27 will be illuminated for alternate short times indicated at 5B. These short pulses when applied to the photoconductive elements 16, 17, 18 and 19 serve to reduce the average photovoltaic voltage generated by the photoconductive cells which would otherwise produce an error in operation of the device. That is, a photovoltaic effect exists only while a photocell is illuminated; the use of short pulses leaves the cells dark during a large part of the cycle of operation. A further advantage in using short pulses of light when the resistance of the cells responds sluggishly to changes in light intensity is an increase of the input impedance of the modulator, since the conductance of each cell is continuously decreasing during most of each cycle. Still another advantage is an improved efficiency of conversion from D.-C. to A.-C. voltage in the modulator.

Referring to FIGURE 5C, a plot of log of resistance as a function of time for the cells 26 and 27 is shown for the condition of very short light pulses. Thus, it is seen that at the instant the cell is illuminated its resistance is lowest, then it increases to a maximum value. The other cell, likewise, goes through the same changes. It should be noted that if the cells of the modulator are properly chosen, the two resistances will have a constant ratio as indicated by the distance 77 between the sloping portion of the log curves. Thus, the output voltage will always have a constant attenuation. For example, if the input voltage is represented by $E_{in}$, then the voltage out at the common junction of a pair of cells fluctuates between $aE_{in}$ and $(1-a)E_{in}$ where $a$ is the ratio $R16/(R16+R17)$ or $R18/(R18+R19)$.

Figure 7:
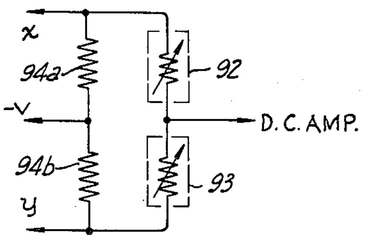
FIGURE 7 shows another demodulator.
Figure 6:
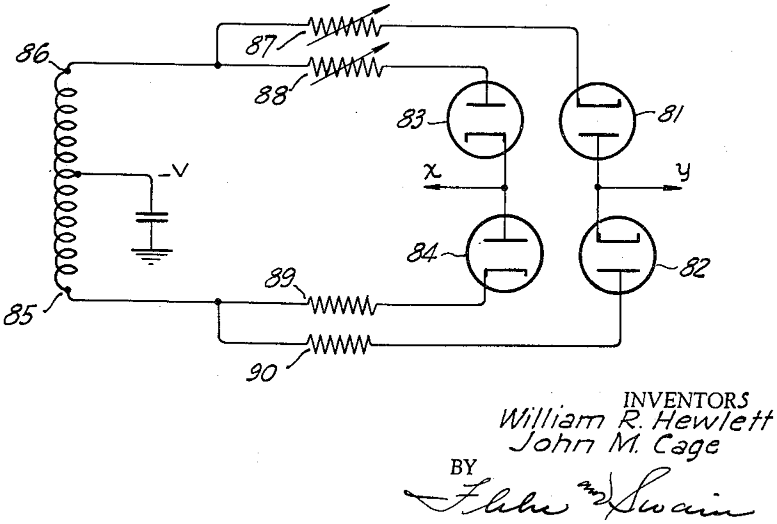
FIGURE 6 shows a demodulator for demodulating the amplified A.-C. output.

Suitable demodulators are shown in FIGURES 6 and 7. In FIGURE 6, a balanced demodulator is shown. The output from the fourth stage of the balanced amplifier is applied to the common terminals of the diodes 81 and 82, and 83 and 84, respectively, as indicated by $x$ and $y$. The two pairs of diodes are resistively connected between the terminals 85 and 86 of the secondary of a transformer. The resistors 87 and 88, and 89 and 90 serve to resistively connect the diodes to the transformer. A bias signal is applied to the center tap of the transformer winding to apply a suitable bias voltage to the grid of tube 61. A suitable alternating current voltage is applied to the primary of the transformer whereby opposite pairs of the diodes become conducting.

Operation of the circuit to demodulate the A.-C. output of the fourth stage is illustrated in FIGURE 8. FIGURE 8A represents the waveform appearing at the terminal $x$ while FIGURE 8B represents the waveform at the terminal $y$. When one pair of diodes is conducting, the bottom portion of the respective wave is clipped. The resultant voltage appearing at the common junction of the resistors 58 and 59 will be as shown in FIGURE 8C. This is a D.-C. voltage which is then amplified by the D.-C. amplifier tube 61 and applied to the cathode follower stage 62.

Another suitable demodulator is shown in FIGURE 7 and comprises a pair of photoconductive elements 92 and 93 serially connected between the terminals $x$ and $y$. The common terminal is connected to the D.-C. amplifier. Alternate ones of the photoconductors are illuminated to become conducting. The signal is rectified as described above. A bias voltage is applied at the common junction of the serially connected resistor $94^a$ and $94^b$.

When the amplifier is employed in a D.-C. voltmeter circuit, it is desirable to provide means for zeroing the meter. Referring to FIGURE 2, the circuit which includes the batteries 100 and 101 in the resistive network comprising resistors 95, 96, 97, 98 and 99 provides a suitable voltage of either polarity. The voltage is applied to one terminal of the modulator through the resistor 94. By adjusting the variable tap on the resistor 95, the voltage may be varied to zero the meter.

A D.-C. amplifier may be constructed which includes a modulator comprising only a pair of photoconductors serially connected to receive the input signal. Alternate ones of the photoconductors are then illuminated by suitable means, for example a neon tube 108 which includes a pair of electrodes in a single envelope to convert the D.-C. signal into an A.-C. signal which is applied to the A.-C. amplifier. Thus, as illustrated in FIGURE 9, the signal is applied to the photoconductive transducers 102 and 103 which are serially connected. The common junction is connected to the input of the A.-C. amplifier 104. The amplified signal is demodulated by the demodulator 105 and further amplified by the D.-C. amplifier 106. A feedback signal is applied along the line 107 and serves to stabilize the amplifier.

Figure 4:
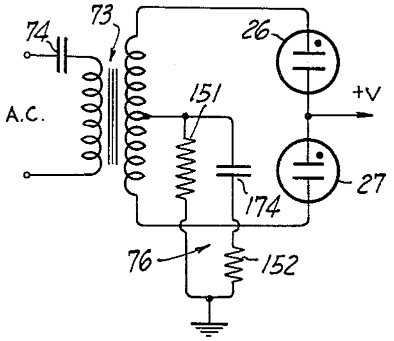
FIGURE 4 shows a circuit for alternately energizing a pair of neon bulbs for a small fraction of each cycle.
Figure 5:
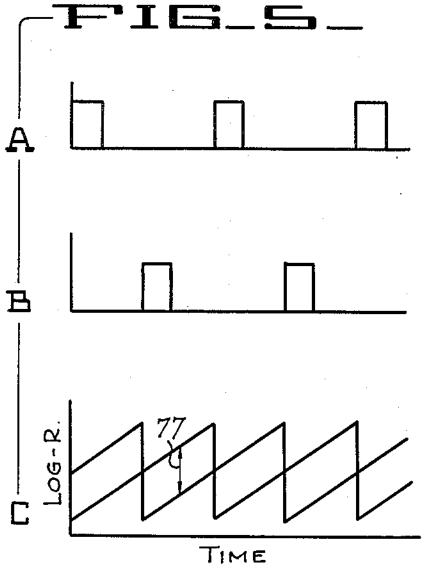
FIGURE 5 shows the light pulses generated by the neon bulbs and a curve showing the logarithm of resistance plotted as a function of time for the photosensitive cells illuminated by the pulses.

A D.-C. voltmeter was constructed as shown in FIGURES 2, 4 and 6 in which the various components had the following values:

Photoconductive cells 16, 17, 18 and 19—Cadmium Selenide cell known by mfgs. spec. as CL–3

Tubes:

| | | |
|---|---|---|
| 30, 36 | Mfg. Spec. | 5751 |
| 48, 49 | Mfg. Spec. | 5751 |
| 51, 52 | Mfg. Spec. | 12AX7 |
| 53, 54 | Mfg. Spec. | 12AX7 |
| 61, 62 | Mfg. Spec. | 12AU7 |
| 81, 82 | Mfg. Spec. | 6AL5 |
| 83, 84 | Mfg. Spec. | 6AL5 |

Neon tubes:

| | |
|---|---|
| 26 | NE16 |
| 27 | NE16 |
| 63 | NE16 |

Resistors:

| | | | | | |
|---|---|---|---|---|---|
| 14 | megohm | 1 | 123 | ohms | 470K |
| 41 | do | 5 | 124 | megohms | 2.2 |
| 42 | do | 2 | 125 | do | 2.2 |
| 43 | do | 5 | 126 | ohms | 2.2K |
| 44 | do | 15 | 127 | do | 470K |
| 45 | do | 15 | 128 | do | 470K |
| 58 | do | 2.2 | 129 | megohms | 2.2 |
| 59 | do | 2.2 | 131 | do | 2.2 |
| 87 | ohms | 0–30K | 132 | ohms | 1K |
| 88 | do | 0–30K | 133 | do | 220K |
| 89 | do | 27K | 134 | do | 220K |
| 90 | do | 27K | 135 | do | 220K |
| 94 | megohms | 10 | 136 | megohm | 1 |
| 95 | do | 1 | 137 | ohms | 33K |
| 96 | ohms | 220K | 138 | megohms | 0–100 |
| 97 | do | 10 | 139 | ohms | 10K |
| 98 | do | 220K | 141 | do | 150K |
| 99 | do | 10 | 142 | do | 100K |
| 110 | do | 216K | 143 | do | 5K |
| 111 | do | 216K | 144 | do | 5K |
| 112 | megohms | 2.2 | 145 | do | 530K |
| 113 | ohms | 10K | 146 | do | 530K |
| 114 | do | 10K | 147 | do | 530K |
| 115 | megohms | 2.2 | 148 | do | 530K |
| 116 | ohms | 22K | 149 | do | 530K |
| 117 | do | 22K | 150 | do | 1K |
| 118 | do | 560K | 151 | do | 220K |
| 121 | do | 560K | 152 | do | 1K |
| 122 | do | 470K | | | |

Capacitors:

| | | | | | |
|---|---|---|---|---|---|
| 13 | mmf | .01 | 163 | mmf | .01 |
| 37 | mmf | .01 | 164 | mmf | .01 |
| 38 | mmf | .0033 | 165 | mmf | .1 |
| 39 | mmf | .01 | 166 | mmf | .1 |
| 40 | mmf | .0033 | 167 | mf | 1 |
| 56 | mmf | .0015 | 168 | mmf | .005 |
| 57 | mmf | .0015 | 169 | mmf | .005 |
| 74 | mf | .27 | 171 | mmf | .005 |
| 158 | mf | 10 | 172 | mmf | .005 |
| 159 | mf | 10 | 173 | mmf | .005 |
| 161 | mmf | .01 | 174 | mf | .5 |
| 162 | mmf | .01 | | | |

Meter:

| | | |
|---|---|---|
| 66 | microamp | 100–0–100 |

Batteries:

| | | |
|---|---|---|
| 46 | v | 1.35 |
| 100 | v | 1.35 |
| 101 | v | 1.35 |

Supply voltages:

$+V=+150$ volts $-V=-105$ volts

A D.-C. vacuum tube voltmeter constructed with the above components was tested. It was capable of measuring voltages as small as $10\mu v.$ with an accuracy of 5%. The drift of the voltmeter when in its most sensitive range was less than $1\mu v.$ per hour.

Thus, it is seen that an improved D.-C. vacuum tube voltmeter has been provided. The meter includes a novel modulator and an improved amplifier circuit.

We claim:

1. A modulator comprising at least one pair of serially connected photoconductive cells connected to receive an input signal, light means arranged adjacent each of said cells and serving to illuminate the associated cell, means for alternately and cyclically energizing said light means for a small fraction of each cycle whereby the cells are illuminated for a small fraction of each cycle, an output terminal connected to the common junction of the cells, said light means comprising a pair of neon tubes and said means for energizing the same comprises a saturating transformer having the neon tubes connected in series between the terminals of its secondary winding.

2. A D.-C. amplifier comprising at least a pair of photo-conductive transducers connected to receive a D.-C. input signal, means serving to alternately and cyclically illuminate said transducers whereby the D.-C. signal is converted into an A.-C. signal and to amplify the same, and detector means connected to receive said amplified A.-C. signal and to form a D.-C. signal, said detector means comprising at least a pair of photoconductive means and means for alternately and cyclically illuminating said photoconductive means.

3. A D.-C. amplifier comprising at least a pair of photoconductive transducers connected to receive a D.-C. input signal, means serving to alternately and cyclically illuminate said transducers whereby the D.-C. signal is converted into an A.-C. signal and to amplify the same, detector means connected to receive said amplified A.-C. signal and to form a D.-C. signal, said detector means comprising at least a pair of photoconductive means and means for alternately and cyclically illuminating said photoconductive means, and a D.-C. amplifier connected to receive said D.-C. signal and amplify the same.

4. A modulator comprising four photoconductive cells connected in a bridge circuit, input terminals connected to a pair of opposite terminals of said bridge circuit, output terminals connected to the other pair of opposite terminals, a pair of light sources arranged adjacent said cells, each light source disposed to illuminate an opposite pair of said cells, and means for alternately and cyclically energizing said light sources for a small fraction of each cycle whereby alternate pairs of cells are illuminated for a small fraction of each cycle.

5. A modulator as in claim 4 wherein said light sources comprise a single neon tube having a pair of electrodes.

6. A modulator as in claim 4 wherein said light sources comprise a pair of neon tubes and wherein said means for energizing the tubes comprises a saturating transformer having the neon tubes connected in series between the terminals of the secondary winding.

7. A modulator as in claim 6 wherein said neon tubes are included in a single envelope.

8. A D.-C. amplifier comprising at least a pair of photoconductive transducers connected to receive a D.-C. input signal, means serving to alternately and cyclically illuminate said transducers whereby the D.-C. signal is converted into an A.-C. signal, A.-C. amplifying means connected to receive said A.-C. signal and to amplify the same, detector means connected to receive said amplified A.-C. signal and to form a D.-C. signal, said detector means comprising at least a pair of photoconductive means and means for alternately and cyclically illuminating said photoconductive means, a D.-C. amplifier connected to receive said D.-C. signal and amplify the same, and a cathode follower connected to receive the amplified D.-C. signal and form an output signal.

9. Apparatus as in claim 8 wherein said A.-C. amplifier includes a degenerative tuned feedback loop, said feedback loop being tuned to the modulator frequency.

References Cited in the file of this patent

UNITED STATES PATENTS

| | | |
|---|---|---|
| 1,770,497 | Schroter | July 15, 1930 |
| 2,065,421 | Bernarde | Dec. 22, 1936 |
| 2,175,335 | Andrieu | Oct. 10, 1939 |
| 2,176,442 | Wise | Oct. 17, 1939 |
| 2,227,147 | Lindsay | Dec. 31, 1940 |
| 2,286,820 | Lenehan | June 16, 1942 |
| 2,297,543 | Eberhardt et al. | Sept. 29, 1942 |
| 2,459,293 | Shonnard | Jan. 18, 1949 |
| 2,459,730 | Williams | Jan. 18, 1949 |
| 2,586,746 | Tyler | Feb. 19, 1952 |
| 2,714,327 | Squyer et al. | Aug. 2, 1955 |
| 2,815,487 | Kaufman | Dec. 3, 1957 |
| 2,839,616 | MacMillan | June 17, 1958 |

FOREIGN PATENTS

| | | |
|---|---|---|
| 626,295 | Great Britain | July 13, 1949 |